United States Patent [19]
Leonard

[11] 3,728,931
[45] Apr. 24, 1973

[54] SCALE INTERVALOMETER

[76] Inventor: Verna M. Leonard, 6353 North Blackstone, Fresno, Calif. 93721

[22] Filed: Aug. 13, 1971

[21] Appl. No.: 171,560

[52] U.S. Cl. ..................................84/471, 84/478
[51] Int. Cl. ..............................................G09b 15/02
[58] Field of Search.........84/470–473, 477–483, 485

[56] References Cited

UNITED STATES PATENTS

| 395,067 | 12/1888 | Maggs | 84/473 |
| 2,938,421 | 5/1960 | Leonard | 84/480 |
| 2,188,098 | 1/1940 | Bostelmann | 84/485 X |

FOREIGN PATENTS OR APPLICATIONS

| 1,218,266 | 6/1966 | Germany | 84/471 |
| 710,999 | 6/1965 | Canada | 84/473 |

Primary Examiner—Richard B. Wilkinson
Assistant Examiner—John F. Gonzales
Attorney—Knox & Knox

[57] ABSTRACT

A device for use by students of music which can be constructed very economically from two sheets of paper or other sheet material to provide the student with quick and easy identification of a root tone and the remaining scale tones and their relationships, including chords and chord inversions, upon his merely adjusting a slider on a holder which may be placed on the keyboard if desired. The fact that for both major and minor scales the intervals are fixed by convention makes it possible to make the slider measure off the intervals against a fixed chromatic scale for the various keys in either mood. Ordinarily the device will have at least two sliders, one for major and one for minor, but the same sliders or other sliders, in a set thereof, are provided with indicators pointing out scale degrees with chords and chord inversions as well as the simple scale tones and their intervals.

4 Claims, 3 Drawing Figures

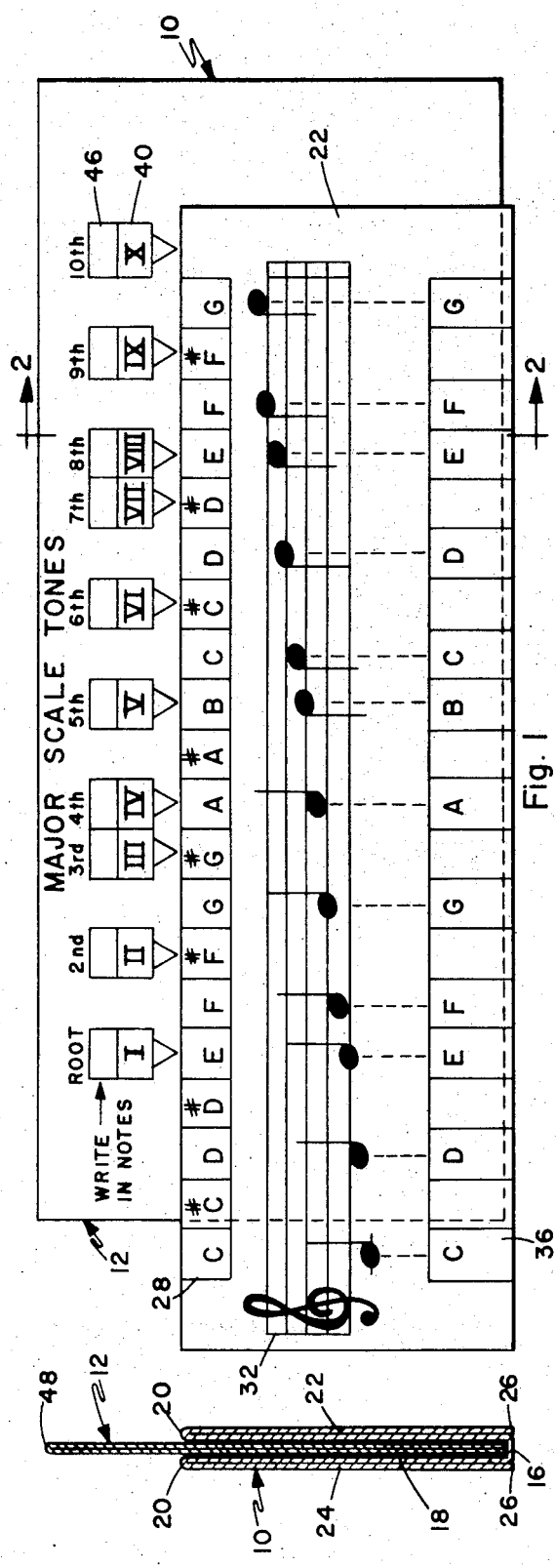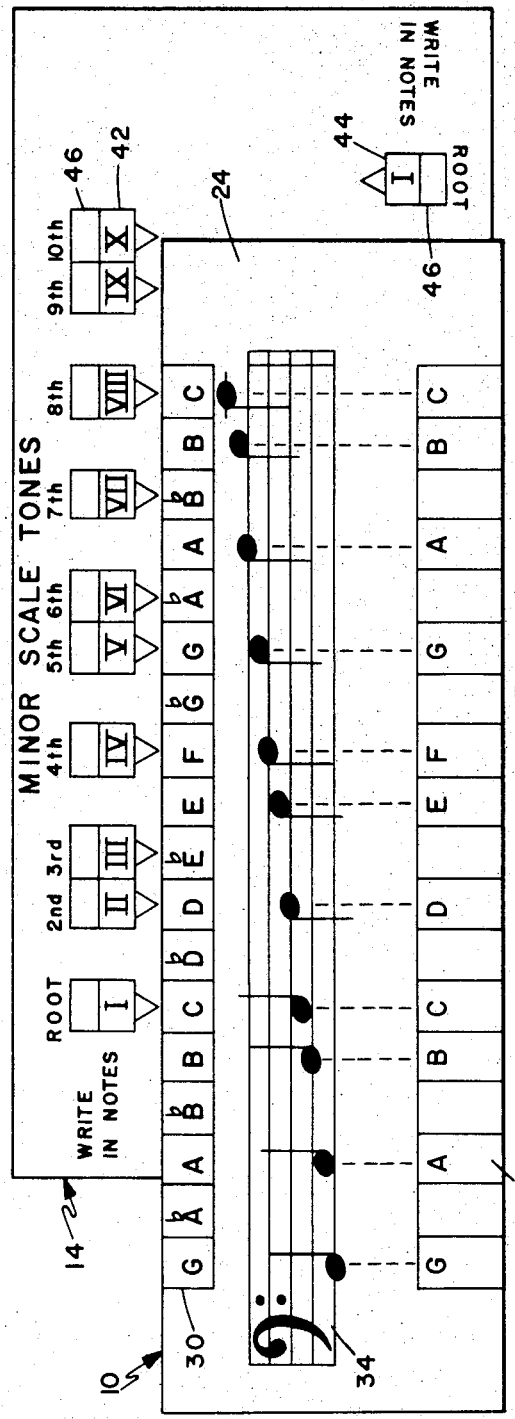

SCALE INTERVALOMETER

BACKGROUND OF THE INVENTION

Intervals between the tones of diatonic scales are established, in our culture, at least for most instruments, within rather close tolerances, the so-called steps and half steps of a major scale or a minor scale being standardized in the commonly employed scale of equal temperament so that the same keyboard keys in a piano or organ keyboard can be used to achieve acceptable scale tone progressions identified by the different key signatures. The background of the instant invention is therefore the fact that these intervals are standarized for different scale tone progressions. Prior art instructional devices include printed key naming cards insertable onto the keyboard and various means to correlate notation with the keys have been proposed. There exists a need, however, for a simple interval measuring device which can be referred to by the student with the device either on or away from the keyboard to provide instant identification of all the tones in a given scale when he knows the root tone, or any other tone of the scale provided he also knows the scale progression concerned.

SUMMARY OF THE INVENTION

As claimed, the present invention meets the above mentioned need and very economically since the holder can be a single sheet of paper or the like and eight or sixteen, or more, scales can be represented on a single reverse or accordian folded sheet as a slider. The holder is also economically constructed from a single panel of sheet material with a channel folded thereinto at the top, to receive the slides which have indicia spaced therealong showing clearly the positional relationships of the tones in either a major or minor scale, preferably identified as scale tone degree progressions, scaled against a chromatic scale representation on the holder, the latter also preferably further identifying the tones by natation, whereby the student can find and/or write in the remaining tones of any scale provided he knows one tone thereof and its degree in the required scale. Obviously the device can be expanded to include slides showing other indicia for finding, writing in and learning not only the different scales but also chords of all kinds including inversions, all based however on the interval measures concept for the different scales.

BRIEF DESCRIPTION OF THE DRAWINGS

FIG. 1 is a front elevational view of the item as disposed in use, the slide shown showing the intervals for a major scale.

FIG. 2 is a vertical cross sectional view taken on the line 2—2 in FIG. 1.

FIG. 3 is a view similar to FIG. 1 and showing a slide for minor scales, the slide in this figure being withdrawn sufficiently to the right to show how the same side of the same fold of the slide is provided with other indicia exposed by inverting the slide and holder in this figure shows the reverse flap provided with bass clef notation to indicate a further possible variation.

DETAILED DESCRIPTION OF A PREFERRED EMBODIMENT

Referring now to the drawing, the holder generally indicated by the numeral 10 is used to support panel slides such as those indicated at 12 and 14. The holder may be constructed very economically from a single panel of sheet material, preferably considerably elongated and double folded centrally and longitudinally thereof as at 16 to define a channel 18 of some width for more than one slide, and also return folded downwardly as at 20—20 to define flaps 22, 24. The lower edges 26 of the flaps may extend beyond the double fold 16 if a shallower channel 18 is desired.

A chromatic scale representation 28 or 30 in either sharps as shown, or flats, is essential in some form and is preferably supplemented by aligned notation 32 or 34 and named key representation 36 or 38 on opposite flaps of the holder. In order for the item to be supported behind the keys on a keyboard to designate the actual keys, the representations 36 and 38 are proportioned accordingly so that the student, even although he ordinarily knows the names of the keys, receives the benefit of visual association of the same with the aligned notation 32, 34, repeated naming at 28, 30, and this in visual relation with the scale degree information on the slide as represented at 40 and 42 and partially represented at 44 in FIG. 3 in inverted disposition for use when the slide is turned upside down.

This scale degree representation as applied to a slide is at the heart of the instant invention, the major scale tones with corresponding pitch intervals indicated at 40 and the same for the minor scales at 42 having associated therewith boxes 46 for the student to write in the names of the scale tones of a complete scale, starting from information limited possibly to the alphabetic name of one key or tone and its degree in the desired scale. For example, if the student is given the information that E is the root tone of the desired major scale he can at once have pointed out to him all the other tones of the key of E major, as illustrated in FIG. 1. By way of further example, if the student is to determine what minor scale has F as its sub-dominant or fourth degree tone, he can use slide 14 is indicated in FIG. 3 to determine at once that this is the key of C minor.

Although only write-in boxes 46 are represented in the drawing it is obvious that the write-in boxes or spaces can be increased as required and when the item is used in connection with instruction in chords or various kinds, including inversions, although the illustrated concept of measured and pointed out intervals for the different scales remains basic to the invention. In this connection the number of write-in boxes or spaces 46 can be increased in numbers as well as dimension at each scale degree portion so that the student may write in, for example, the root position chord E, Csharp, B above the indicated I, III and V degree boxes 40, as well as the first inversion in superinposed boxes, not shown, at III, V and VIII, and the second inversion in still further superimposed boxes above the degree boxes V, VIII and X. This consideration emphasizes the desirability of the construction of the slides, for economic reasons, from single panels of sheet material, ordinarily paper, accordion folded so that indicia can be placed on both longitudinal edges of each flap and on both sides of the panel when the same is reversed. As represented in FIG. 2 eight sets of indicia 42-46 will appear on a single sheet and this can be multiplied by simply making a simple accordion fold instead of the represented simple fold 48 at the top of the slide or panel 12.

The manner of using the invention will be obvious from a consideration of the foregoing description and abstract.

I claim:

1. Sliderule apparatus comprising:

an elongated holder being a single section of sheet material folded longitudinally in a collapsed M-fold providing an upwardly opening channel and two downwardly extending outer flaps (22, 24) having thereon chromatic scale representation of the tones in a portion of a piano keyboard including at least one octave;

a similarly elongated panel slide having thereon interval indicators showing the pitch intervals between the tones of a diatonic scale;

said panel slide being slidably adjustably mounted in said channel so that, with one of said indicators adjusted to display and point out one of said tones in said chromatic scale representation, the other indicators point out relationships of the remaining tones in said diatonic scale.

2. Sliderule apparatus according to claim 1 wherein said panel slide is invertible with different sets of said indicators, each set being on a longitudinal edge portion of the panel slide extending above the upper edge of said channel so that said sets are visable one at a time.

3. Sliderule apparatus according to claim 1 wherein said panel slide is reversible front to back with different sets of indicators with each set being on a longitudinal edge portion of the panel slide extending above the upper edge of said channel so that said sets are visable one at a time.

4. Sliderule apparatus according to claim 2 wherein said interval indicators have positionally associated therewith marked writing surfaces whereon students write in names of tones and/or chords, and said panel slides being constructed fron single strip sheets of paper so that it is economically feasible to use said panel slides as work sheets.

* * * * *